US012562116B2

(12) United States Patent
Wang et al.

(10) Patent No.: US 12,562,116 B2
(45) Date of Patent: Feb. 24, 2026

(54) PIXEL AND DISPLAY APPARATUS INCLUDING THE SAME

(71) Applicant: Samsung Display Co., Ltd., Yongin-Si (KR)

(72) Inventors: In Soo Wang, Yongin-si (KR); Sang Yong No, Yongin-si (KR); Keuk-Jin Jeong, Yongin-si (KR); Yongwoo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/819,628

(22) Filed: Aug. 29, 2024

(65) Prior Publication Data

US 2025/0078756 A1 Mar. 6, 2025

(30) Foreign Application Priority Data

Sep. 5, 2023 (KR) ........................ 10-2023-0117345

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ... G09G 3/32–3291; G09G 2300/0421; G09G 2300/0426; G09G 2300/0809; G09G 2300/0819; G09G 2300/0842; G09G 2300/0861; G09G 2300/0866; G09G 2310/0243; G09G 2310/027–0275;
(Continued)

(56) References Cited

U.S. PATENT DOCUMENTS 5,627,457 A * 5/1997 Ishiyama ............. G09G 3/3674 345/94
10,297,221 B2 5/2019 Hwang et al.
(Continued)

FOREIGN PATENT DOCUMENTS

KR 10-2020-0108230 A 9/2020
KR 10-2021-0143970 A 11/2021
(Continued)

*Primary Examiner* — Nathan Danielsen
(74) *Attorney, Agent, or Firm* — Innovation Counsel LLP

(57) ABSTRACT

A pixel includes a driving switching element including a control electrode connected to a first node, a first electrode connected to a second node and a second electrode connected to a third node, a writing switching element including a control electrode receiving a writing gate signal, a first electrode receiving a data voltage and a second electrode connected to the second node, a compensation switching element including a control electrode receiving a compensation gate signal, a first electrode connected to the first node and a second electrode connected to the third node, a storage capacitor including a first electrode receiving a first power voltage and a second electrode connected to the first node, the light emitting element emitting a light based on a driving current flowing through the driving switching element. The writing gate signal is n-th stage gate signal. The compensation gate signal is (n+k)-th stage gate signal.

14 Claims, 11 Drawing Sheets

(52) U.S. Cl.
CPC . *G09G 2300/0861* (2013.01); *G09G 2310/08* (2013.01); *G09G 2330/021* (2013.01)

(58) Field of Classification Search
CPC ........ G09G 2310/0286–0297; G09G 2310/06; G09G 2310/08; G09G 2320/0233; G09G 2320/0242; G09G 2320/0252; G09G 2320/0257; G09G 2320/0266; G09G 2320/04; G09G 2330/02; G09G 2330/021; G09G 2330/028
See application file for complete search history.

(56) References Cited

U.S. PATENT DOCUMENTS

| | | | | |
|---|---|---|---|---|
| 11,393,399 | B2 | 7/2022 | Na | |
| 2004/0227405 | A1* | 11/2004 | Nonaka | H02M 3/07 307/43 |
| 2008/0074382 | A1* | 3/2008 | Lee | G09G 3/3413 345/88 |
| 2015/0223304 | A1* | 8/2015 | Li | G09G 3/3406 315/118 |
| 2021/0082339 | A1* | 3/2021 | Zhang | G09G 3/2092 |
| 2021/0264857 | A1* | 8/2021 | Wang | G09G 3/3258 |
| 2023/0116660 | A1* | 4/2023 | Kim | G09G 3/3291 345/76 |
| 2023/0282163 | A1* | 9/2023 | Hamer | G09G 3/3233 345/212 |
| 2024/0233633 | A1* | 7/2024 | Yonebayashi | G09G 3/3266 |

FOREIGN PATENT DOCUMENTS

| | | | |
|---|---|---|---|
| KR | 10-2323292 | B1 | 11/2021 |
| KR | 10-2022-0127184 | A | 9/2022 |

* cited by examiner

PIXEL AND DISPLAY APPARATUS INCLUDING THE SAME

PRIORITY STATEMENT

This application claims priority, under 35 U.S.C. § 119, to Korean Patent Application No. 10-2023-0117345 filed on Sep. 5, 2023 in the Korean Intellectual Property Office KIPO, the contents of which are herein incorporated by reference in their entireties.

BACKGROUND

1. Field

The present inventive concept relates to a pixel and a display apparatus including the pixel. More particularly, the present inventive concept relates to a pixel including one capacitor, and accordingly reducing a power consumption, reducing a stain due to a process variation and enabling a high resolution design and a display apparatus including the pixel.

2. Description of the Related Art

Generally, a display apparatus includes a display panel and a display panel driver. The display panel includes a plurality of gate lines, a plurality of data lines, a plurality of emission lines and a plurality of pixels. The display panel driver includes a gate driver, a data driver, an emission driver and a driving controller. The gate driver outputs gate signals to the gate lines. The data driver outputs data voltages to the data lines. The emission driver outputs emission signals to the emission lines. The driving controller controls the gate driver, the data driver and the emission driver.

When a pixel includes two capacitors, a data voltage is distributed between the two capacitors. Hence, the data voltage has to be at a high enough level to drive the pixel with two capacitors. The high data voltage may increase a power consumption of the display apparatus.

In addition, a possibility of a stain occurrence is high in a manufacturing process of capacitors due to process variation so that the possibility of the stain occurrence may further increase when the pixel includes two capacitors.

In addition, when the pixel includes two capacitors, a space occupied by the capacitors increases so that a resolution of the display panel may be limited.

SUMMARY

Embodiments of the present inventive concept provide a pixel capable of reducing a power consumption, reducing a stain due to a process variation and enabling a high resolution design.

Embodiments of the present inventive concept provide a display apparatus including the pixel.

In an embodiment of a pixel according to the present inventive concept, the pixel includes a driving switching element, a writing switching element, a compensation switching element, a storage capacitor and a light emitting element. The driving switching element includes a control electrode connected to a first node, a first electrode connected to a second node and a second electrode connected to a third node. The writing switching element includes a control electrode configured to receive a writing gate signal, a first electrode configured to receive a data voltage and a second electrode connected to the second node. The compensation switching element includes a control electrode configured to receive a compensation gate signal, a first electrode connected to the first node and a second electrode connected to the third node. The storage capacitor includes a first electrode configured to receive a first power voltage and a second electrode connected to the first node. The light emitting element is configured to emit light based on a driving current flowing through the driving switching element. The writing gate signal is an n-th stage writing gate signal. The compensation gate signal is an (n+k)-th stage writing gate signal. n is a positive integer. k is a positive integer.

In an embodiment, the writing gate signal may be the n-th stage writing gate signal. The compensation gate signal may be an (n+1)-th stage writing gate signal.

In an embodiment, the pixel may further include a first emission switching element including a first electrode connected to the third node and a second electrode connected to a first electrode of the light emitting element and a second emission switching element including a first electrode configured to receive the first power voltage and a second electrode connected to the second node.

In an embodiment, an (n+1)-th stage emission signal may be applied to a control electrode of the first emission switching element. An n-th stage emission signal may be applied to a control electrode of the second emission switching element.

In an embodiment, a signal applied to a control electrode of the first emission switching element may be the same as a signal applied to a control electrode of the second emission switching element.

In an embodiment, the pixel may further include an initialization switching element including a control electrode configured to receive an initialization gate signal, a first electrode configured to receive an initialization voltage and a second electrode connected to the first electrode of the light emitting element.

In an embodiment, in a first period, an n-th stage emission signal applied to a control electrode of the second emission switching element may have an inactive level, an (n+1)-th stage emission signal applied to a control electrode of the first emission switching element may have an active level, the writing gate signal may have an active pulse, the compensation gate signal may have an inactive level and the initialization gate signal may have an inactive level. In a second period subsequent to the first period, the n-th stage emission signal may have the inactive level, the (n+1)-th stage emission signal may have an inactive level, the writing gate signal may have an inactive level, the compensation gate signal may have an active pulse and the initialization gate signal may have the inactive level. In a third period subsequent to the second period, the n-th stage emission signal may have the inactive level and an active level subsequent to the inactive level, the (n+1)-th stage emission signal may have the inactive level, the writing gate signal may have the inactive level, the compensation gate signal may have the inactive level and the initialization gate signal may have an active pulse. In a fourth period subsequent to the third period, the n-th stage emission signal may have the active level, the (n+1)-th stage emission signal may have the active level, the writing gate signal may have the inactive level, the compensation gate signal may have the inactive level and the initialization gate signal may have the inactive level.

In an embodiment, in a first period, an n-th stage emission signal applied to a control electrode of the second emission switching element may have an inactive level, an (n+1)-th stage emission signal applied to a control electrode of the first emission switching element may have an active level, the writing gate signal may have a first active pulse, the compensation gate signal may have an inactive level and the initialization gate signal may have an inactive level. In a second period subsequent to the first period, the n-th stage emission signal may have the inactive level, the (n+1)-th stage emission signal may have an inactive level, the writing gate signal may have a second active pulse, the compensation gate signal may have a first active pulse and the initialization gate signal may have the inactive level. In a third period subsequent to the second period, the n-th stage emission signal may have the inactive level and an active level subsequent to the inactive level, the (n+1)-th stage emission signal may have the inactive level, the writing gate signal may have the inactive level, the compensation gate signal may have a second active pulse and the initialization gate signal may have an active pulse. In a fourth period subsequent to the third period, the n-th stage emission signal may have the active level, the (n+1)-th stage emission signal may have the active level, the writing gate signal may have the inactive level, the compensation gate signal may have the inactive level and the initialization gate signal may have the inactive level.

In an embodiment, in a first period, an n-th stage emission signal applied to a control electrode of the first emission switching element and a control electrode of the second emission switching element may have an inactive level, the writing gate signal may have a first active pulse, the compensation gate signal may have an inactive level and the initialization gate signal may have an inactive level. In a second period subsequent to the first period, the n-th stage emission signal may have the inactive level, the writing gate signal may have a second active pulse, the compensation gate signal may have a first active pulse and the initialization gate signal may have the inactive level. In a third period subsequent to the second period, the n-th stage emission signal may have the inactive level, the writing gate signal may have the inactive level, the compensation gate signal may have a second active pulse and the initialization gate signal may have an active pulse. In a fourth period subsequent to the third period, the n-th stage emission signal may have an active level, the writing gate signal may have the inactive level, the compensation gate signal may have the inactive level and the initialization gate signal may have the inactive level.

In an embodiment, in a first period, an n-th stage emission signal applied to a control electrode of the first emission switching element and a control electrode of the second emission switching element may have an inactive level, the writing gate signal may have an active pulse, the compensation gate signal may have an inactive level and the initialization gate signal may have an inactive level. In a second period subsequent to the first period, the n-th stage emission signal may have the inactive level, the writing gate signal may have an inactive level, the compensation gate signal may have an active pulse and the initialization gate signal may have the inactive level. In a third period subsequent to the second period, the n-th stage emission signal may have the inactive level, the writing gate signal may have the inactive level, the compensation gate signal may have the inactive level and the initialization gate signal may have an active pulse. In a fourth period subsequent to the third period, the n-th stage emission signal may have an active level, the writing gate signal may have the inactive level, the compensation gate signal may have the inactive level and the initialization gate signal may have the inactive level.

In an embodiment of a display apparatus according to the present inventive concept, the display apparatus includes a display panel including a pixel and a display panel driver configured to output a data voltage to the pixel. The pixel includes a driving switching element, a writing switching element, a compensation switching element, a storage capacitor and a light emitting element. The driving switching element includes a control electrode connected to a first node, a first electrode connected to a second node and a second electrode connected to a third node. The writing switching element includes a control electrode configured to receive a writing gate signal, a first electrode configured to receive the data voltage and a second electrode connected to the second node. The compensation switching element includes a control electrode configured to receive a compensation gate signal, a first electrode connected to the first node and a second electrode connected to the third node. The storage capacitor includes a first electrode configured to receive a first power voltage and a second electrode connected to the first node. The light emitting element is configured to emit light based on a driving current flowing through the driving switching element. The writing gate signal is an n-th stage writing gate signal. The compensation gate signal is an (n+k)-th stage writing gate signal. n is a positive integer. k is a positive integer.

In an embodiment, the display panel driver may include a power regulator including a power terminal configured to receive a data power voltage, a first input terminal configured to receive a reference voltage and a second input terminal and an output terminal which are connected to each other and an amplifier including a power terminal connected to the output terminal of the power regulator, a first input terminal configured to receive a first data, a second input terminal configured to receive a second data and an output terminal.

In an embodiment, the display panel driver may further include a reference voltage generator configured to output the reference voltage to the first input terminal of the power regulator. The reference voltage generator may include a bipolar junction transistor configured to output a first voltage, a second voltage generator configured to generate a second voltage, a multiplier configured to generate a multiplied voltage by a multiplication of the second voltage and an adder configured to add the multiplied voltage to the first voltage to generate the reference voltage.

In an embodiment, the amplifier may include a first circuit configured to receive the first data and the second data and a second circuit connected to the first circuit to output operation data.

In an embodiment, the first circuit may include a first transistor including a control electrode connected to a first operation node, a first electrode configured to receive a second data power voltage and a second electrode connected to the first operation node, a second transistor including a control electrode connected to the first operation node, a first electrode configured to receive the second data power voltage and a second electrode connected to a second operation node, a third transistor including a control electrode configured to receive the first data, a first electrode connected to the first operation node and a second electrode connected to a third operation node, a fourth transistor including a control electrode configured to receive the second data, a first electrode connected to the second operation node and a second electrode connected to the third operation node and a fifth transistor including a control electrode configured to receive an enable signal, a first electrode connected to the third operation node and a second electrode connected to a ground.

In an embodiment, the second circuit may include a sixth transistor including a control electrode connected to the second operation node, a first electrode configured to receive the second data power voltage and a second electrode connected to the output terminal of the amplifier and a seventh transistor including a control electrode configured to receive a disable signal, a first electrode connected to the output terminal of the amplifier and a second electrode connected to the ground.

In an embodiment, a level of the second data power voltage may be substantially the same as a level of the data power voltage. A ripple of the second data power voltage may be less than a ripple of the data power voltage.

In an embodiment, the display panel driver may further include a filter including a diode connected to the output terminal of the amplifier and a first capacitor connected to the diode.

In an embodiment, the power regulator, the amplifier and the filter may be integrated on a peripheral region of the display panel.

In an embodiment, the power regulator, the amplifier and the filter may be formed as an integrated element. The integrated element may be connected to the display panel.

According to the pixel and the display apparatus including the pixel, the pixel may include one capacitor. Thus, the data voltage having a low level may be used to drive the pixel. The data voltage having a low level is used so that the power consumption of the display apparatus may be reduced.

To stably drive the display panel with the data voltage having the low level, the power voltage applied to the amplifier may be generated by passing through the power regulator. In addition, the amplifier includes an operator and a driver which are separated from each other so that the ripple component of the data voltage may be reduced.

In addition, the number of capacitors of the pixel is reduced to one so that the possibility of the stain occurrence may be reduced.

In addition, the number of capacitors of the pixel is reduced to one so that the space occupied by the capacitors may be reduced so that the resolution of the display panel may be increased.

BRIEF DESCRIPTION OF THE DRAWINGS

The above and other features and advantages of the present inventive concept will become more apparent by describing in detailed embodiments thereof with reference to the accompanying drawings, in which.

DETAILED DESCRIPTION OF THE INVENTIVE CONCEPT

Hereinafter, the present inventive concept will be explained in detail with reference to the accompanying drawings.

Figure 1:
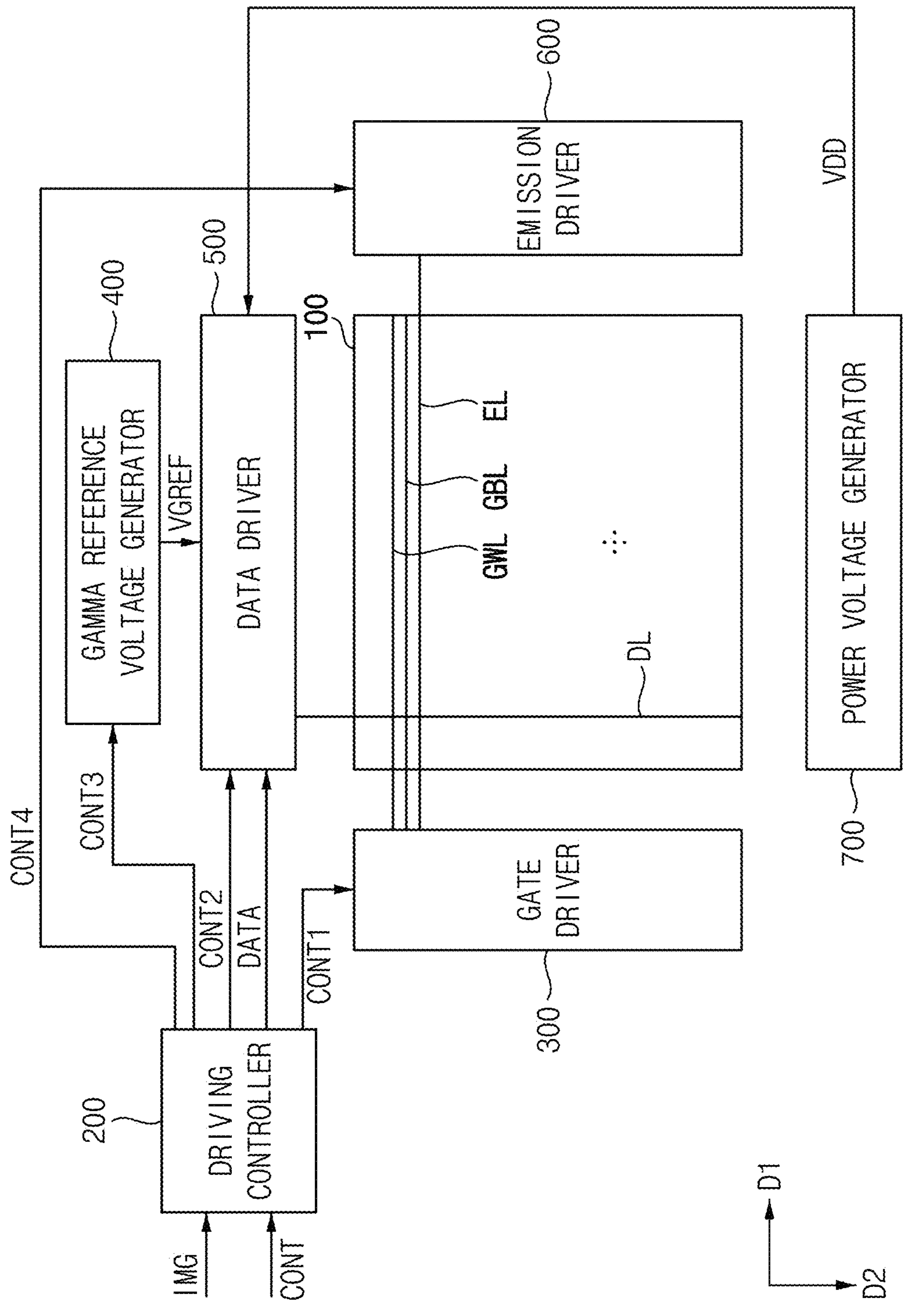
FIG. 1 is a block diagram illustrating a display apparatus according to an embodiment of the present inventive concept.

FIG. 1 is a block diagram illustrating a display apparatus according to an embodiment of the present inventive concept.

Referring to FIG. 1, the display apparatus includes a display panel 100 and a display panel driver. The display panel driver includes a driving controller 200, a gate driver 300, a gamma reference voltage generator 400, a data driver 500, an emission driver 600 and a power voltage generator 700.

The display panel 100 has a display region on which an image is displayed and a peripheral region adjacent to the display region.

The display panel 100 includes a plurality of gate lines GWL and GBL, a plurality of data lines DL, a plurality of emission lines EL and a plurality of pixels electrically connected to the gate lines GWL and GBL, the data lines DL and the emission lines EL. The gate lines GWL and GBL may extend in a first direction D1, the data lines DL may extend in a second direction D2 crossing the first direction D1 and the emission lines EL may extend in the first direction D1.

The driving controller 200 receives input image data IMG and an input control signal CONT from an external apparatus. For example, the input image data IMG may include red image data, green image data and blue image data. The input image data IMG may include white image data. The input image data IMG may include magenta image data, cyan image data and yellow image data. The input control signal CONT may include a master clock signal and a data enable signal. The input control signal CONT may further include a vertical synchronizing signal and a horizontal synchronizing signal.

The driving controller 200 generates a first control signal CONT1, a second control signal CONT2, a third control signal CONT3, a fourth control signal CONT4 and a data signal DATA based on the input image data IMG and the input control signal CONT.

The driving controller 200 generates the first control signal CONT1 for controlling an operation of the gate driver 300 based on the input control signal CONT, and outputs the first control signal CONT1 to the gate driver 300. The first control signal CONT1 may include a vertical start signal and a gate clock signal.

The driving controller 200 generates the second control signal CONT2 for controlling an operation of the data driver 500 based on the input control signal CONT, and outputs the second control signal CONT2 to the data driver 500. The second control signal CONT2 may include a horizontal start signal and a load signal.

The driving controller 200 generates the data signal DATA based on the input image data IMG. The driving controller 200 outputs the data signal DATA to the data driver 500.

The driving controller 200 generates the third control signal CONT3 for controlling an operation of the gamma reference voltage generator 400 based on the input control signal CONT, and outputs the third control signal CONT3 to the gamma reference voltage generator 400.

The driving controller 200 generates the fourth control signal CONT4 for controlling an operation of the emission driver 600 based on the input control signal CONT, and outputs the fourth control signal CONT4 to the emission driver 600.

The gate driver 300 generates gate signals driving the gate lines GWL and GBL in response to the first control signal CONT1 received from the driving controller 200. The gate driver 300 may output the gate signals to the gate lines GWL and GBL.

The gamma reference voltage generator 400 generates a gamma reference voltage VGREF in response to the third control signal CONT3 received from the driving controller 200. The gamma reference voltage generator 400 provides the gamma reference voltage VGREF to the data driver 500. The gamma reference voltage VGREF has a value corresponding to a level of the data signal DATA.

In an embodiment, the gamma reference voltage generator 400 may be disposed in the driving controller 200, or in the data driver 500.

The data driver 500 receives the second control signal CONT2 and the data signal DATA from the driving controller 200, and receives the gamma reference voltages VGREF from the gamma reference voltage generator 400. The data driver 500 converts the data signal DATA into data voltages having an analog type using the gamma reference voltages VGREF. The data driver 500 outputs the data voltages to the data lines DL.

The emission driver 600 generates emission signals to drive the emission lines EL in response to the fourth control signal CONT4 received from the driving controller 200. The emission driver 600 may output the emission signals to the emission lines EL.

The power voltage generator 700 may output a data power voltage VDD to the data driver 500. Although not shown in figures, the power voltage generator 700 may further output a power voltage to at least one of the display panel 100, the driving controller 200, the gate driver 300 and the gamma reference voltage generator 400.

Although the gate driver 300 is disposed at a first side of the display panel 100 and the emission driver 600 is disposed at a second side of the display panel 100 opposite to the first side in FIG. 1 for convenience of explanation, the present inventive concept may not be limited thereto. For example, both of the gate driver 300 and the emission driver 600 may be disposed at the first side of the display panel 100. For example, both of the gate driver 300 and the emission driver 600 may be disposed at both sides (e.g. the first side and the second side) of the display panel 100. For example, the gate driver 300 and the emission driver 600 may be integrally formed.

Figure 2:
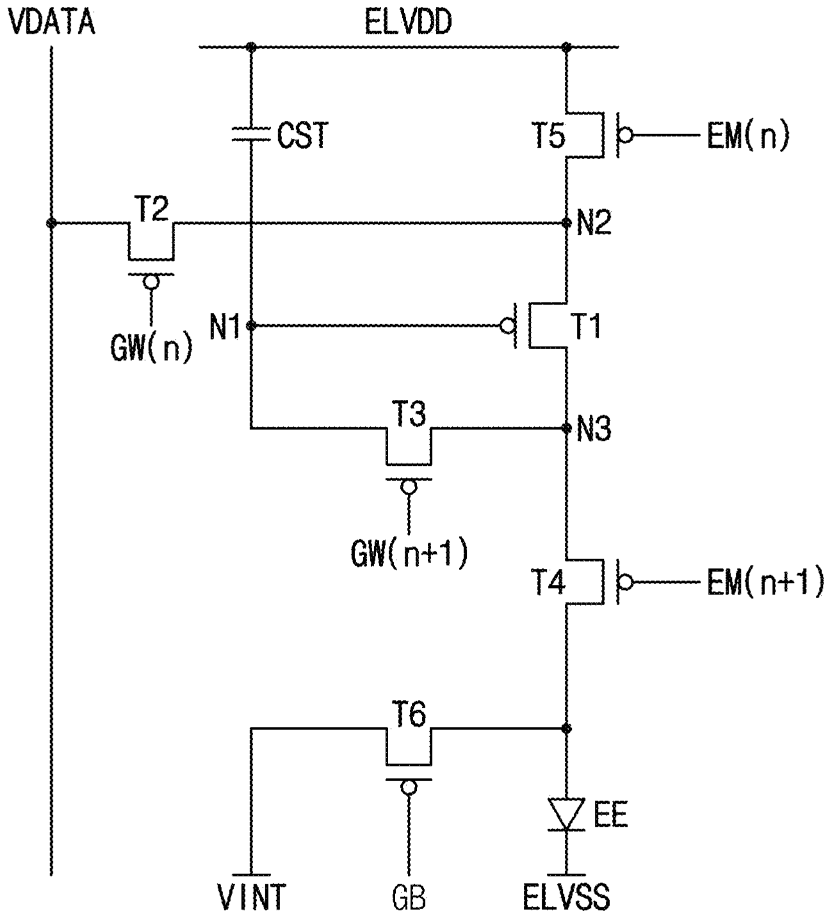
FIG. 2 is a circuit diagram illustrating a pixel of a display panel of FIG. 1.
Figure 3:
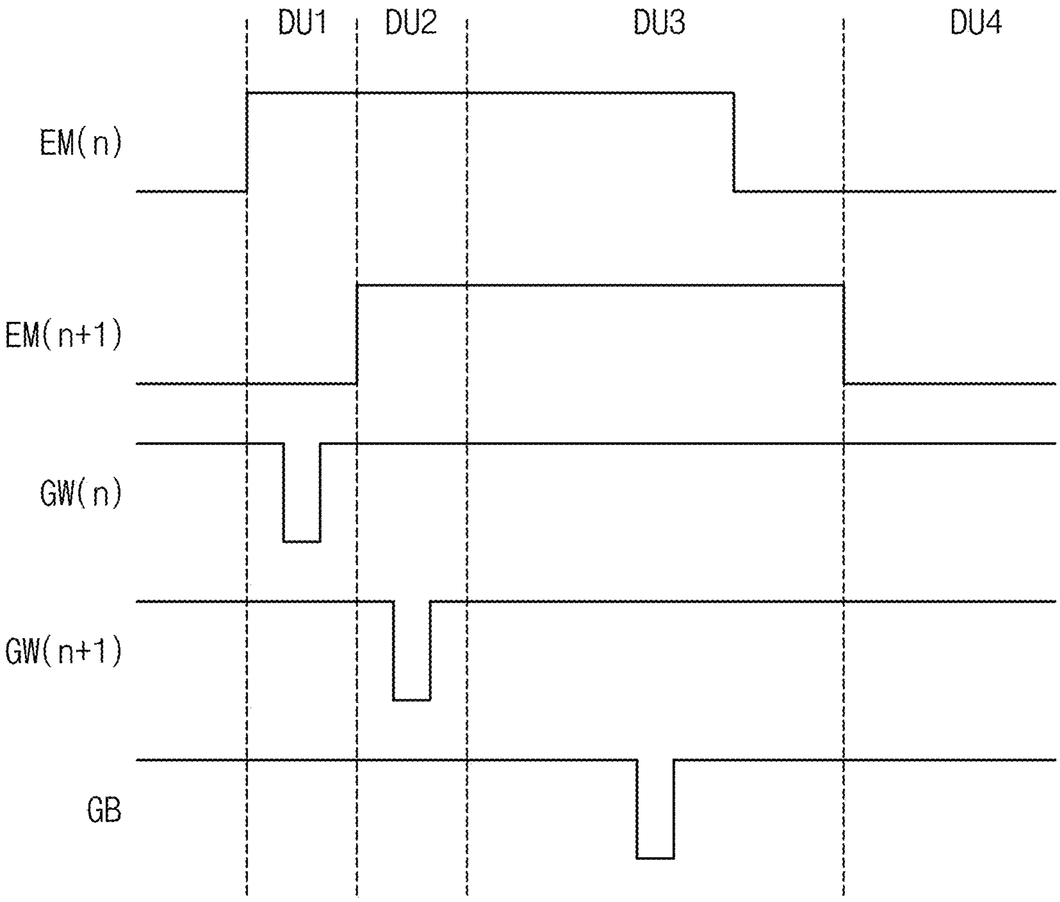
FIG. 3 is a timing diagram illustrating input signals applied to the pixel of FIG. 2.

FIG. 2 is a circuit diagram illustrating a pixel of the display panel 100 of FIG. 1. FIG. 3 is a timing diagram illustrating input signals applied to the pixel of FIG. 2.

Referring to FIGS. 1 to 3, the display panel 100 includes the plurality of the pixels. Each pixel includes a light emitting element EE.

The pixel receives a writing gate signal GW(n), a compensation gate signal GW(n+1), an initialization gate signal GB, the data voltage VDATA and the emission signal EM(n) and EM(n+1) and the light emitting element EE of the pixel emits light with a luminance level corresponding to the level of the data voltage VDATA to display the image.

The pixel includes a driving switching element T1, a writing switching element T2, a compensation switching element T3, a storage capacitor CST and the light emitting element EE.

The driving switching element T1 includes a control electrode connected to a first node N1, a first electrode connected to a second node N2 and a second electrode connected to a third node N3.

The writing switching element T2 includes a control electrode receiving the writing gate signal GW(n), a first electrode receiving the data voltage VDATA and a second electrode connected to the second node N2.

The compensation switching element T3 includes a control electrode receiving the compensation gate signal GW(n+1), a first electrode connected to the first node N1 and a second electrode connected to the third node N3.

The storage capacitor CST includes a first electrode receiving a first power voltage ELVDD and a second electrode connected to the first node N1.

The light emitting element EE emits a light based on the driving current flowing through the driving switching element T1. The light emitting element EE may be a micro organic light emitting diode (Micro-OLED).

In the present embodiment, the writing gate signal may be an n-th stage writing gate signal GW(n), the compensation gate signal may be an (n+k)-th stage writing gate signal GW(n+k), wherein n and k are positive integers independent of each other. For example, the writing gate signal may be the n-th stage writing gate signal GW(n) and the compensation gate signal may be an (n+1)-th stage writing gate signal GW(n+1). In this case, an additional gate driving circuit for generating the compensation gate signal is not required so that a dead space of the display apparatus may be reduced.

The pixel may further include a first emission switching element T4 including a first electrode connected to the third node N3 and a second electrode connected to a first electrode of the light emitting element EE and a second emission switching element T5 including a first electrode receiving the first power voltage ELVDD and a second electrode connected to the second node N2.

In the present embodiment, an (n+m)-th stage emission signal EM(n+m) may be applied to a control electrode of the first emission switching element T4 and an n-th stage emission signal EM(n) may be applied to a control electrode of the second emission switching element T5. Herein, m is a positive integer. For example, an (n+1)-th stage emission signal EM(n+1) may be applied to the control electrode of the first emission switching element T4 and the n-th stage emission signal EM(n) may be applied to the control electrode of the second emission switching element T5.

The pixel may further include an initialization switching element T6 including a control electrode receiving the initialization gate signal GB, a first electrode receiving an initialization voltage VINT and a second electrode connected to a first electrode of the light emitting element EE.

For example, the driving switching element T1, the writing switching element T2, the compensation switching element T3, the first emission switching element T4, the second emission switching element T5 and the initialization switching element T6 may be p-type thin film transistors. For example, the driving switching element T1, the writing switching element T2, the compensation switching element T3, the first emission switching element T4, the second emission switching element T5 and the initialization switching element T6 may be low temperature polysilicon (LTPS) thin film transistors.

As shown in FIG. 3, in a first period DU1, the n-th stage emission signal EM(n) applied to the control electrode of the second emission switching element T5 may have an inactive level, the (n+1)-th stage emission signal EM(n+1) applied to the control electrode of the first emission switching element T4 may have an active level, the writing gate signal GW(n) may have an active pulse, the compensation gate signal GW(n+1) may have an inactive level and the initialization gate signal GB may have an inactive level. The first period DU1 may be a data writing period.

In a second period DU2 subsequent to the first period DU1, the n-th stage emission signal EM(n) may have the inactive level, the (n+1)-th stage emission signal EM(n+1) may have an inactive level, the writing gate signal GW(n) may have an inactive level, the compensation gate signal GW(n+1) may have an active pulse and the initialization gate signal GB may have the inactive level. The second period DU2 may be a threshold voltage compensating period of the driving switching element T1.

In a third period DU3 subsequent to the second period DU2, the n-th stage emission signal EM(n) may have the inactive level and an active level subsequent to the inactive level, the (n+1)-th stage emission signal EM(n+1) may have the inactive level, the writing gate signal GW(n) may have the inactive level, the compensation gate signal GW(n+1) may have the inactive level and the initialization gate signal GB may have an active pulse. The third period DU3 may be an initialization period of the light emitting element EE.

In a fourth period DU4 subsequent to the third period DU3, the n-th stage emission signal EM(n) may have the active level, the (n+1)-th stage emission signal EM(n+1) may have the active level, the writing gate signal GW(n) may have the inactive level, the compensation gate signal GW(n+1) may have the inactive level and the initialization gate signal GB may have the inactive level. The fourth period DU4 may be a light emitting period.

Figure 4:
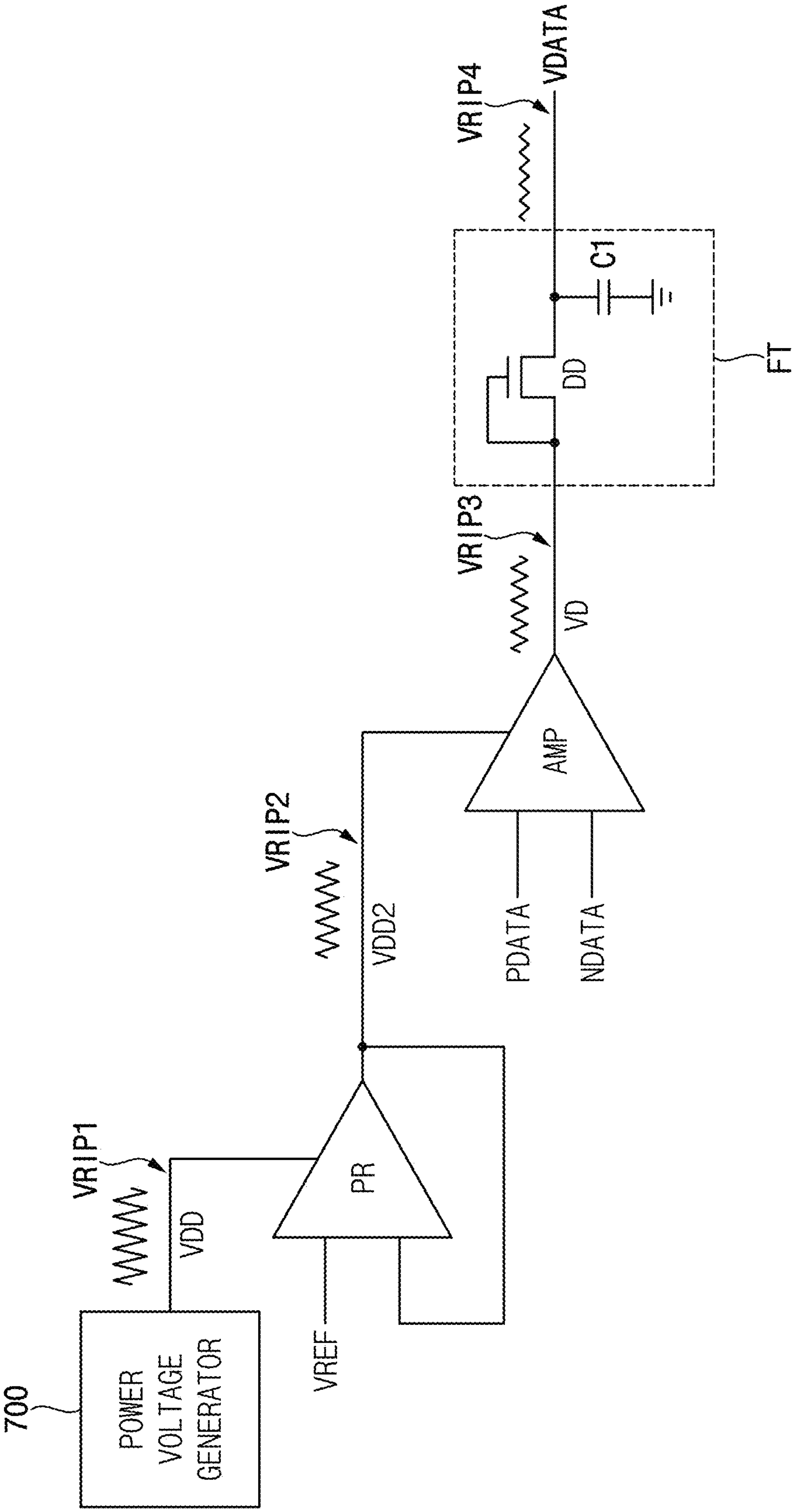
FIG. 4 is a circuit diagram illustrating a data driver of FIG. 1.
Figure 5A:
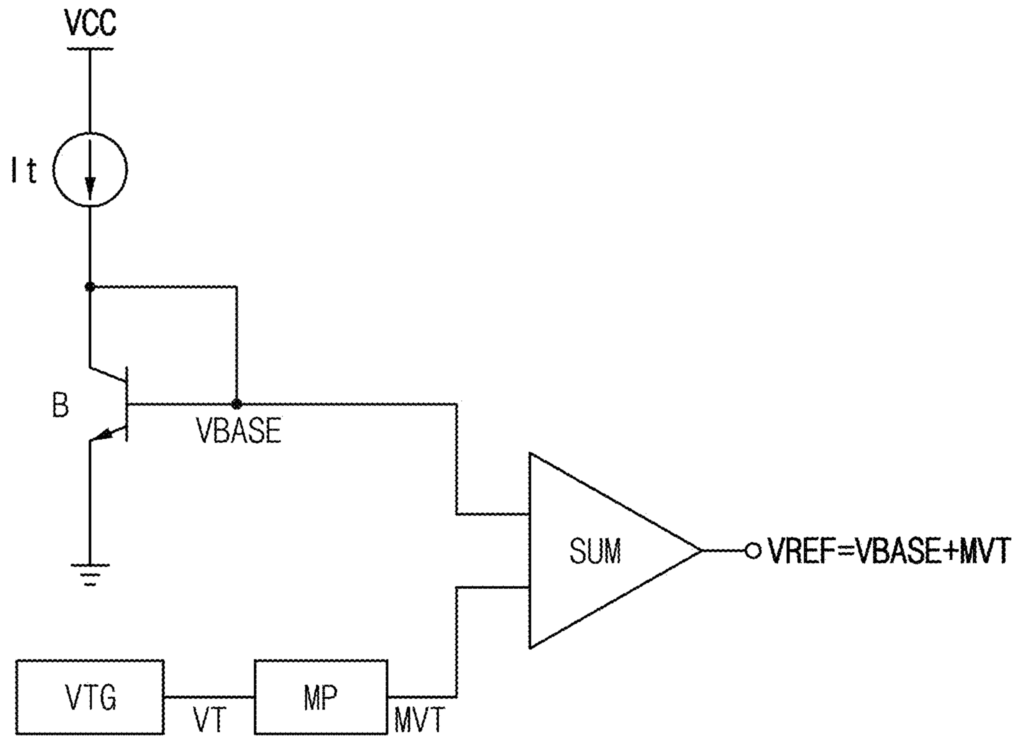
FIG. 5A is a circuit diagram illustrating a reference voltage generator generating a reference voltage applied to a power regulator of FIG. 4.
Figure 5B:
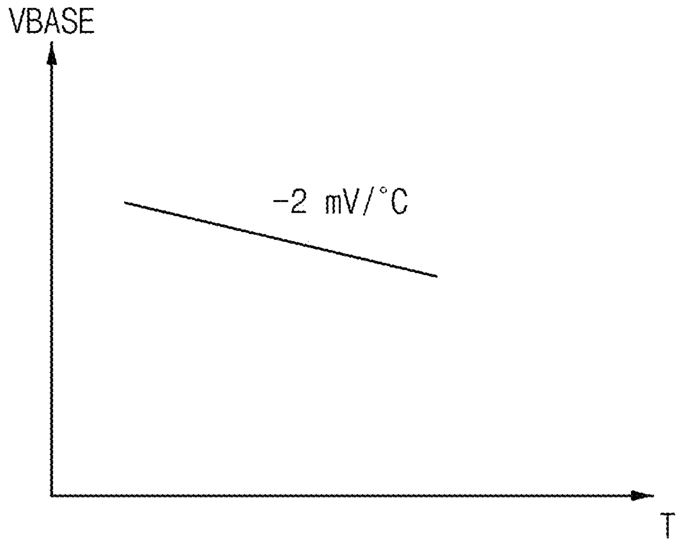
FIG. 5B is a graph illustrating a voltage level of a first voltage of FIG. 5A according to a temperature.
Figure 5C:
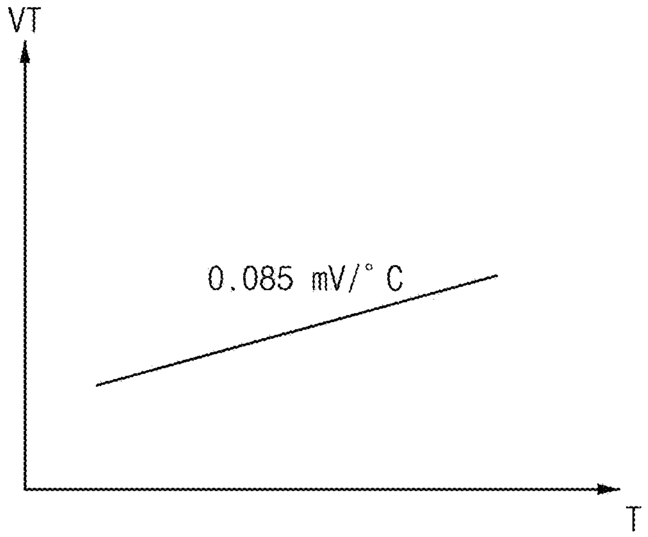
FIG. 5C is a graph illustrating a voltage level of a second voltage of FIG. 5A according to a temperature.
Figure 6:
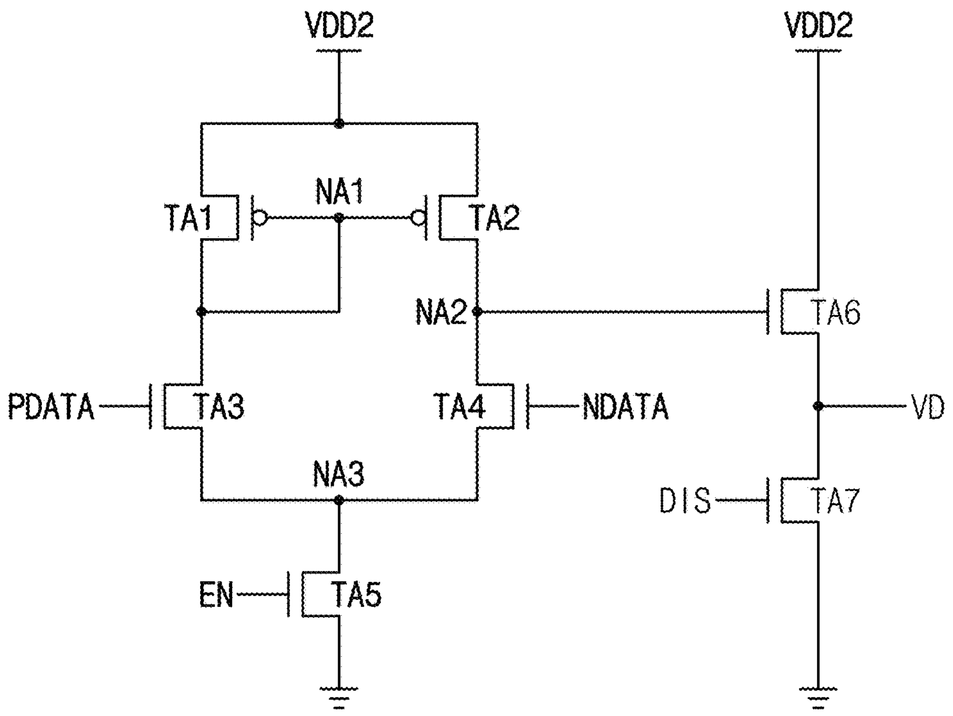
FIG. 6 is a circuit diagram illustrating an amplifier of FIG. 4.

FIG. 4 is a circuit diagram illustrating the data driver 500 of FIG. 1. FIG. 5A is a circuit diagram illustrating a reference voltage generator generating a reference voltage VREF applied to a power regulator PR of FIG. 4. FIG. 5B is a graph illustrating a voltage level of a first voltage VBASE of FIG. 5A according to a temperature. FIG. 5C is a graph illustrating a voltage level of a second voltage VT of FIG. 5A according to a temperature. FIG. 6 is a circuit diagram illustrating an amplifier AMP of FIG. 4.

Referring to FIGS. 1 to 6, the display panel driver may output the data voltage to the pixel. The display panel driver may include the power regulator PR and the amplifier AMP. The display panel driver may further include the reference voltage generator. The display panel driver may further include a filter FT. The power regulator PR, the amplifier AMP, the reference voltage generator and the filter FT may be included in the data driver 500. However, the present inventive concept may not be limited thereto. Alternatively, the power regulator PR, the amplifier AMP, the reference voltage generator and the filter FT may be disposed outside of the data driver 500. At least one of the power regulator PR, the amplifier AMP, the reference voltage generator and the filter FT may be included in another element or integrated on the display panel 100.

The power regulator PR includes a power terminal receiving the data power voltage VDD, a first input terminal receiving the reference voltage VREF and a second input terminal and an output terminal which are connected to each other.

The amplifier AMP may include a power terminal connected to the output terminal of the power regulator PR, a first input terminal receiving a first data PDATA, a second input terminal receiving a second data NDATA and an output terminal.

As shown in FIG. 5A, the reference voltage generator may output the reference voltage VREF to the first input terminal of the power regulator PR. The reference voltage generator may include a bipolar junction transistor B outputting the first voltage VBASE, a second voltage generator VTG generating the second voltage VT, a multiplier MP generating a multiplied voltage MVT by a multiplication of the second voltage VT and an adder SUM adding the multiplied voltage MVT to the first voltage VBASE to generate the reference voltage VREF. The reference voltage generator may further include a current source It disposed between a terminal of a reference power voltage VCC and the bipolar junction transistor B.

As shown in FIG. 5B, a voltage level of the first voltage VBASE may decrease as the temperature increases.

In contrast, as shown in FIG. 5C, a voltage level of the second voltage VT may increase as the temperature increases.

The reference voltage generator may generate the reference voltage VREF by adding the multiplied voltage MVT to the first voltage VBASE so that the reference voltage VREF may be almost unaffected by the temperature.

As shown in FIG. 6, the amplifier AMP may include a first circuit receiving the first data PDATA and the second data NDATA and outputting an operation data VD and a second circuit outputting the operation data VD.

For example, the first circuit may include a first transistor TA1 including a control electrode connected to a first operation node NA1, a first electrode receiving a second data power voltage VDD2 and a second electrode connected to the first operation node NA1, a second transistor TA2 including a control electrode connected to the first operation node NA1, a first electrode receiving the second data power voltage VDD2 and a second electrode connected to a second operation node NA2, a third transistor TA3 including a control electrode receiving the first data PDATA, a first electrode connected to the first operation node NA1 and a second electrode connected to a third operation node NA3, a fourth transistor TA4 including a control electrode receiving the second data NDATA, a first electrode connected to the second operation node NA2 and a second electrode connected to the third operation node NA3 and a fifth transistor TA5 including a control electrode receiving an enable signal EN, a first electrode connected to the third operation node NA3 and a second electrode connected to a ground.

The second circuit may include a sixth transistor TA6 including a control electrode connected to the second operation node NA2, a first electrode receiving the second data power voltage VDD2 and a second electrode connected to the output terminal of the amplifier AMP and a seventh transistor TA7 including a control electrode receiving a disable signal DIS, a first electrode connected to the output terminal of the amplifier AMP and a second electrode connected to the ground.

The data power voltage VDD outputted by the power voltage generator 700 is not applied directly to the amplifier AMP but is applied to the amplifier AMP through the power regulator PR.

A level of the second data power voltage VDD2 generated by passing through the power regulator PR may be substantially the same as a level of the data power voltage VDD. In contrast, a ripple VRIP2 of the second data power voltage VDD2 may be less than a ripple VRIP1 of the data power voltage VDD.

The amplifier AMP includes the first circuit corresponding to the operator and the second circuit corresponding to the driver which are separated from each other so that a ripple component VRIP3 is generated as an output voltage VD of the amplifier AMP. The ripple component VRIP3 of the output voltage VD of the amplifier AMP may be less than the ripple VRIP2 of the second data power voltage VDD2.

The filter FT may include a diode DD connected to the output terminal of the amplifier AMP and a first capacitor C connected to the diode DD.

The output voltage VD that is supplied to the filter FT may be substantially the same as the data voltage VDATA of the filter FT. In contrast, a ripple component VRIP4 of the output voltage VDATA of the filter FT may be less than the ripple component VRIP3 of the voltage VD that is supplied to the filter FT.

The pixel of the display panel 100 includes only one capacitor so that the range of a data applying voltage and the power consumption of the display apparatus may be reduced. When the range of the data applying voltage is small, it may generally be difficult to express grayscale levels well.

The data voltage VDATA output from the display panel driver has a very little ripple component VRIP4 so that the grayscale levels may be expressed even if the range of the data applying voltage is small. Thus, the reliability of the display apparatus may be enhanced. For example, the range of the data applying voltage for the pixel of the present embodiment which includes only one capacitor may be about 1V. However, a range of a data applying voltage for a conventional pixel which includes two capacitors may be about 2V.

In an embodiment of the present inventive concept, the power regulator PR, the amplifier AMP and the filter FT may be integrated on the peripheral region of the display panel 100 as s system circuit.

Alternatively, in an embodiment of the present inventive concept, the power regulator PR, the amplifier AMP and the filter FT may be formed as a separate integrated element. The separate integrated element including the power regulator PR, the amplifier AMP and the filter FT may be connected to the display panel 100. For example, the power regulator PR, the amplifier AMP and the filter FT may be formed as a separate element that may be mounted on the display panel 100.

According to the present embodiment, the pixel may include one capacitor CST. Thus, the data voltage VDATA having a low level may be used to drive the pixel. The data voltage VDATA having a low level is used so that the power consumption of the display apparatus may be reduced compared to a pixel with two capacitors. For example, the data voltage for the pixel of the present embodiment which includes only one capacitor may be between about 2V to about 3V. However, the data voltage for the conventional pixel which includes two capacitors may be between about 4V to about 6V.

To stably drive the display panel 100 with the data voltage VDATA having the low level, the second data power voltage VDD2 applied to the amplifier AMP may be generated by passing through the power regulator PR. In addition, the amplifier AMP includes the operator and the driver which are separated from each other so that the ripple component of the data voltage VDATA may be reduced.

In addition, the number of capacitors CST in the pixel is reduced to one so that the possibility of the stain occurrence may be reduced.

In addition, the number of capacitors CST of the pixel being reduced to one decreases the space occupied by the capacitors CST, and the resolution of the display panel 100 may be increased.

For example, the display apparatus according to the present embodiment may be a micro display including the micro organic light emitting diode Micro-OLED. For example, the pixel may be formed on a silicon substrate. For example, the display apparatus may be a micro display including pixels formed on the silicon substrate. In the micro display, the level of the data voltage VDATA is reduced so that the power consumption may be reduced. In the micro display, the number of the capacitors CST of the pixel is reduced so that the resolution may be increased.

Figure 7:
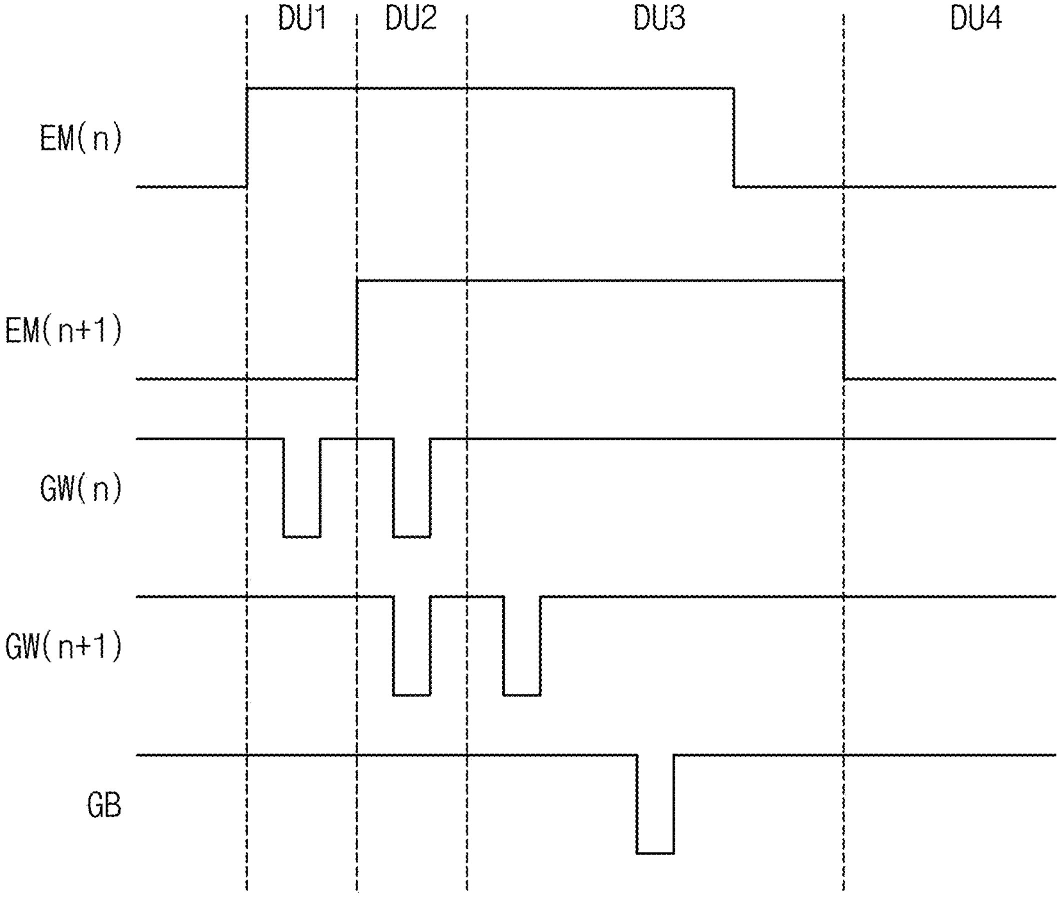
FIG. 7 is a timing diagram illustrating input signals applied to a pixel of a display apparatus according to an embodiment of the present inventive concept.

FIG. 7 is a timing diagram illustrating input signals applied to a pixel of a display apparatus according to an embodiment of the present inventive concept.

The display apparatus according to the present embodiment is substantially the same as the display apparatus of the previous embodiment explained referring to FIGS. 1 to 6 except for timings of the gate signals. Thus, the same reference numerals will be used to refer to the same or like parts as those described in the previous embodiment of FIGS. 1 to 6 and any repetitive explanation concerning the above elements will be omitted.

Referring to FIGS. 1, 2 and 4 to 7, the display panel 100 includes the plurality of the pixels. Each pixel includes a light emitting element EE.

The pixel receives a writing gate signal GW(n), a compensation gate signal GW(n+1), an initialization gate signal GB, the data voltage VDATA and the emission signal EM(n) and EM(n+1) and the light emitting element EE of the pixel emits light with a luminance level corresponding to the level of the data voltage VDATA to display the image.

The pixel includes a driving switching element T1, a writing switching element T2, a compensation switching element T3, a storage capacitor CST and the light emitting element EE.

The driving timing of the pixel of the present embodiment is substantially the same as the driving timing of the pixel of FIG. 3 except that the writing gate signal GW(n) and the compensation gate signal GW(n+1) include two pulses. However, the present inventive concept may not be limited thereto. Alternatively, the writing gate signal GW(n) and the compensation gate signal GW(n+1) may include three or more pulses.

For example, in a first period DU1, the n-th stage emission signal EM(n) applied to the control electrode of the second emission switching element T5 may have an inactive level, the (n+1)-th stage emission signal EM(n+1) applied to the control electrode of the first emission switching element T4 may have an active level, the writing gate signal GW(n) may have a first active pulse, the compensation gate signal GW(n+1) may have an inactive level and the initialization gate signal GB may have an inactive level.

In a second period DU2 subsequent to the first period DU1, the n-th stage emission signal EM(n) may have the inactive level, the (n+1)-th stage emission signal EM(n+1) may have an inactive level, the writing gate signal GW(n) may have a second active pulse, the compensation gate signal GW(n+1) may have a first active pulse and the initialization gate signal GB may have the inactive level. In the embodiments of FIG. 3 and FIG. 7, the second period DU2 immediately follows the first period DU1.

In a third period DU3 subsequent to the second period DU2, the n-th stage emission signal EM(n) may have the inactive level that changes to an active level during the third period DU3, the (n+1)-th stage emission signal EM(n+1) may have the inactive level, the writing gate signal GW(n) may have the inactive level, the compensation gate signal GW(n+1) may have a second active pulse and the initialization gate signal GB may have an active pulse. In the embodiments of FIG. 3 and FIG. 7, the third period DU3 immediately follows the second period DU2.

In a fourth period DU4 subsequent to the third period DU3, the n-th stage emission signal EM(n) may have the active level, the (n+1)-th stage emission signal EM(n+1) may have the active level, the writing gate signal GW(n) may have the inactive level, the compensation gate signal GW(n+1) may have the inactive level and the initialization gate signal GB may have the inactive level. In the embodiments of FIG. 3 and FIG. 7, the fourth period DU4 immediately follows the third period DU3.

According to the present embodiment, the pixel may include one capacitor CST. Thus, the data voltage VDATA having a low level may be used to drive the pixel. The data voltage VDATA having a low level is used so that the power consumption of the display apparatus may be reduced.

To stably drive the display panel 100 with the data voltage VDATA having the low level, the second data power voltage VDD2 applied to the amplifier AMP may be generated by passing through the power regulator PR. In addition, the amplifier AMP includes the operator and the driver which are separated from each other so that the ripple component of the data voltage VDATA may be reduced.

In addition, the number of capacitors CST of the pixel is reduced to one so that the possibility of the stain occurrence may be reduced.

In addition, the number of capacitors CST of the pixel is reduced to one so that the space occupied by the capacitors CST may be reduced so that the resolution of the display panel 100 may be increased.

Figure 8:
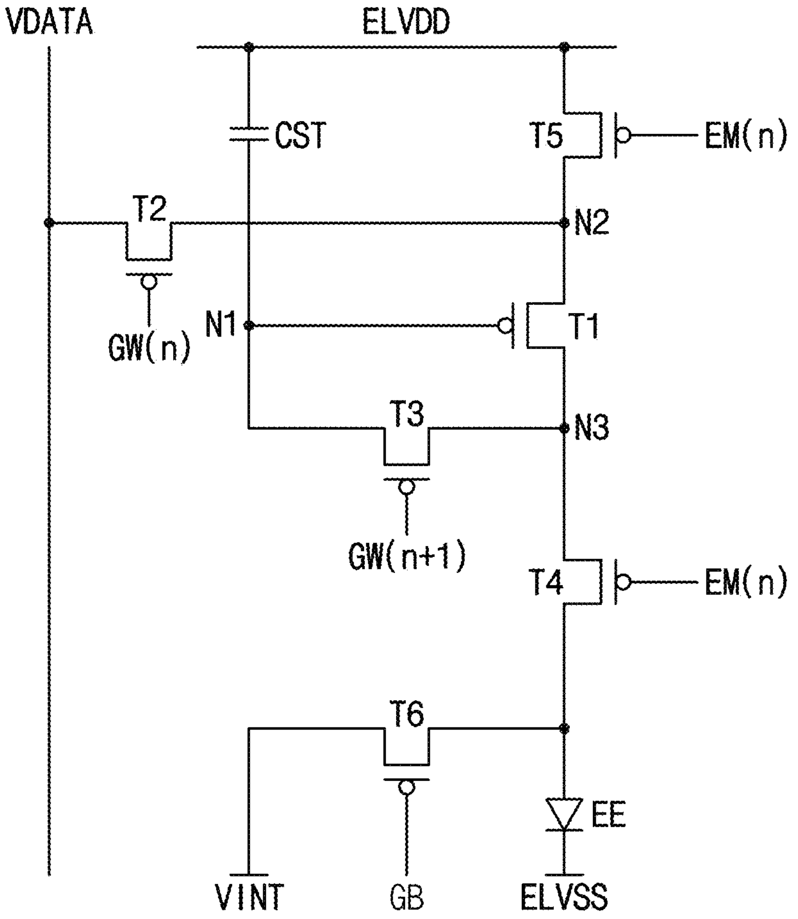
FIG. 8 is a circuit diagram illustrating a pixel of a display apparatus according to an embodiment of the present inventive concept.
Figure 9:
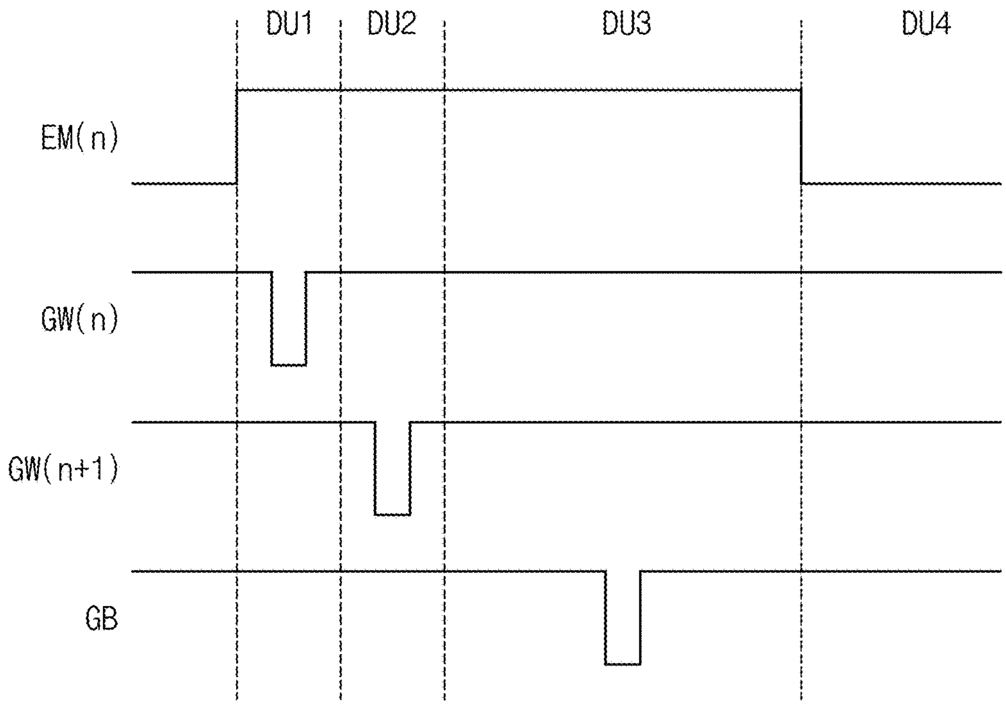
FIG. 9 is a timing diagram illustrating input signals applied to the pixel of FIG. 8.

FIG. 8 is a circuit diagram illustrating a pixel of a display apparatus according to an embodiment of the present inventive concept. FIG. 9 is a timing diagram illustrating input signals applied to the pixel of FIG. 8.

The display apparatus according to the present embodiment is substantially the same as the display apparatus of the previous embodiment explained referring to FIGS. 1 to 6 except for the emission signal applied to the first emission switching element T4. Thus, the same reference numerals will be used to refer to the same or like parts as those described in the previous embodiment of FIGS. 1 to 6 and any repetitive explanation concerning the above elements will be omitted.

Referring to FIGS. 1, 4 to 6, 8 and 9, the display panel 100 includes the plurality of the pixels. Each pixel includes a light emitting element EE.

The pixel receives a writing gate signal GW(n), a compensation gate signal GW(n+1), an initialization gate signal GB, the data voltage VDATA and the emission signal EM(n), and the light emitting element EE of the pixel emits light with a luminance level corresponding to the level of the data voltage VDATA to display the image.

The pixel includes a driving switching element T1, a writing switching element T2, a compensation switching element T3, a storage capacitor CST and the light emitting element EE.

The pixel may further include a first emission switching element T4 including a first electrode connected to the third node N3 and a second electrode connected to a first electrode of the light emitting element EE and a second emission switching element T5 including a first electrode receiving the first power voltage ELVDD and a second electrode connected to the second node N2.

In the present embodiment, a signal applied to a control electrode of the first emission switching element T4 may be the same as a signal applied to a control electrode of the second emission switching element T5. For example, an n-th stage emission signal EM(n) may be applied to the control electrode of the first emission switching element T4 and the control electrode of the second emission switching element T5.

In a first period DU1, the n-th stage emission signal EM(n) applied to the control electrode of the first emission switching element T4 and the control electrode of the second emission switching element T5 may have an inactive level, the writing gate signal GW(n) may have an active pulse, the compensation gate signal GW(n+1) may have an inactive level and the initialization gate signal GB may have an inactive level.

In a second period DU2 subsequent to the first period DU1, the n-th stage emission signal EM(n) may have the inactive level, the writing gate signal GW(n) may have an inactive level, the compensation gate signal GW(n+1) may have an active pulse and the initialization gate signal GB may have the inactive level.

In a third period DU3 subsequent to the second period DU2, the n-th stage emission signal EM(n) may have the inactive level, the writing gate signal GW(n) may have the inactive level, the compensation gate signal GW(n+1) may have the inactive level and the initialization gate signal GB may have an active pulse.

In a fourth period DU4 subsequent to the third period DU3, the n-th stage emission signal EM(n) may have an active level, the writing gate signal GW(n) may have the inactive level, the compensation gate signal GW(n+1) may have the inactive level and the initialization gate signal GB may have the inactive level.

According to the present embodiment, the pixel may include one capacitor CST. Thus, the data voltage VDATA having a low level may be used to drive the pixel. Using the data voltage VDATA having a low level may reduce power consumption of the display apparatus.

To stably drive the display panel 100 with the data voltage VDATA having the low level, the second data power voltage VDD2 applied to the amplifier AMP may be generated by passing through the power regulator PR. In addition, the amplifier AMP includes the operator and the driver which are separated from each other so that the ripple component of the data voltage VDATA may be reduced.

In addition, the number of capacitors CST of the pixel is reduced to one so that the possibility of the stain occurrence may be reduced.

In addition, the number of capacitors CST of the pixel is reduced to one so that the space occupied by the capacitors CST may be reduced so that the resolution of the display panel 100 may be increased.

Figure 10:
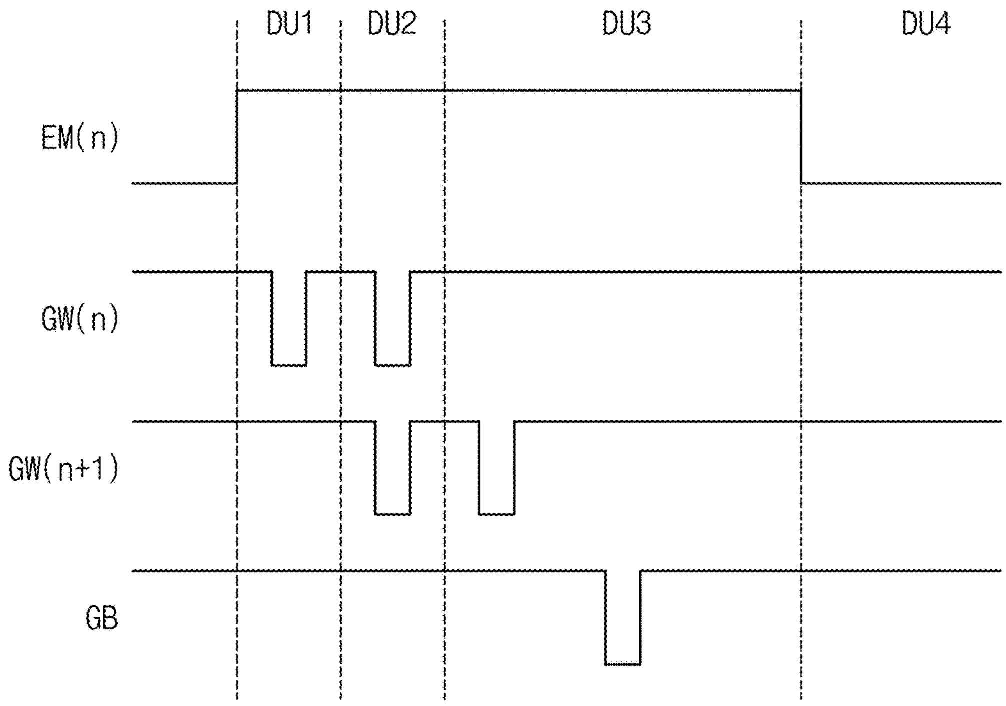
FIG. 10 is a timing diagram illustrating input signals applied to a pixel of a display apparatus according to an embodiment of the present inventive concept.

FIG. 10 is a timing diagram illustrating input signals applied to a pixel of a display apparatus according to an embodiment of the present inventive concept.

The display apparatus according to the present embodiment is substantially the same as the display apparatus of the previous embodiment explained referring to FIGS. 8 and 9 except for timings of the gate signals. Thus, the same reference numerals will be used to refer to the same or like parts as those described in the previous embodiment of FIGS. 8 and 9 and any repetitive explanation concerning the above elements will be omitted.

Referring to FIGS. 1, 4 to 6, 8 and 10, the display panel 100 includes the plurality of the pixels. Each pixel includes a light emitting element EE.

The pixel receives a writing gate signal GW(n), a compensation gate signal GW(n+1), an initialization gate signal GB, the data voltage VDATA and the emission signal EM(n). The light emitting element EE of the pixel emits light with a luminance level corresponding to the level of the data voltage VDATA to display the image.

The pixel includes a driving switching element T1, a writing switching element T2, a compensation switching element T3, a storage capacitor CST and the light emitting element EE.

The pixel may further include a first emission switching element T4 including a first electrode connected to the third node N3 and a second electrode connected to a first electrode of the light emitting element EE and a second emission switching element T5 including a first electrode receiving the first power voltage ELVDD and a second electrode connected to the second node N2.

In the present embodiment, a signal applied to a control electrode of the first emission switching element T4 may be the same as a signal applied to a control electrode of the second emission switching element T5. For example, an n-th stage emission signal EM(n) may be applied to the control electrode of the first emission switching element T4 and the control electrode of the second emission switching element T5.

The driving timing of the pixel of the present embodiment is substantially the same as the driving timing of the pixel of FIG. 9 except that the writing gate signal GW(n) and the compensation gate signal GW(n+1) include two pulses. However, the present inventive concept may not be limited thereto. Alternatively, the writing gate signal GW(n) and the compensation gate signal GW(n+1) may include three or more pulses.

For example, in a first period DU1, the n-th stage emission signal EM(n) applied to the control electrode of the first emission switching element T4 and the control electrode of the second emission switching element T5 may have an inactive level, the writing gate signal GW(n) may have a first active pulse, the compensation gate signal GW(n+1) may have an inactive level and the initialization gate signal GB may have an inactive level.

In a second period DU2 subsequent to the first period DU1, the n-th stage emission signal EM(n) may have the inactive level, the writing gate signal GW(n) may have a second active pulse, the compensation gate signal GW(n+1) may have a first active pulse and the initialization gate signal GB may have the inactive level. In the embodiments of FIG. 9 and FIG. 10, the second period DU2 immediately follows the first period DU1.

In a third period DU3 subsequent to the second period DU2, the n-th stage emission signal EM(n) may have the inactive level, the writing gate signal GW(n) may have the inactive level, the compensation gate signal GW(n+1) may have a second active pulse and the initialization gate signal GB may have an active pulse. In the embodiments of FIG. 9 and FIG. 10, the third period DU3 immediately follows the second period DU2.

In a fourth period DU4 subsequent to the third period DU3, the n-th stage emission signal EM(n) may have the active level, the writing gate signal GW(n) may have the inactive level, the compensation gate signal GW(n+1) may have the inactive level and the initialization gate signal GB may have the inactive level. In the embodiments of FIG. 9 and FIG. 10, the fourth period DU4 immediately follows the third period DU3.

According to the present embodiment, the pixel may include one capacitor CST. Thus, the data voltage VDATA having a low level may be used to drive the pixel. The data voltage VDATA having a low level may reduce the power consumption of the display apparatus.

To stably drive the display panel 100 with the data voltage VDATA having the low level, the second data power voltage VDD2 applied to the amplifier AMP may be generated by passing through the power regulator PR. In addition, the amplifier AMP includes the operator and the driver which are separated from each other so that the ripple component of the data voltage VDATA may be reduced.

In addition, the number of capacitors CST of the pixel is reduced to one so that the possibility of the stain occurrence may be reduced.

In addition, the number of capacitors CST of the pixel is reduced to one so that the space occupied by the capacitors CST may be reduced so that the resolution of the display panel 100 may be increased.

Figure 11:
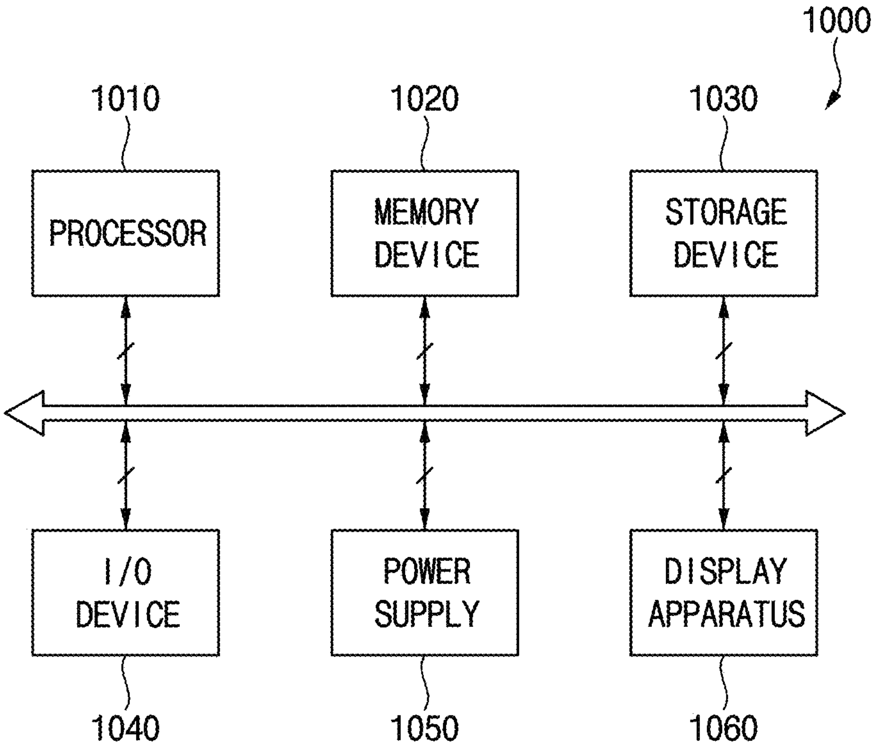
FIG. 11 is a block diagram illustrating an electronic apparatus according to an embodiment of the present inventive concept.
Figure 12:
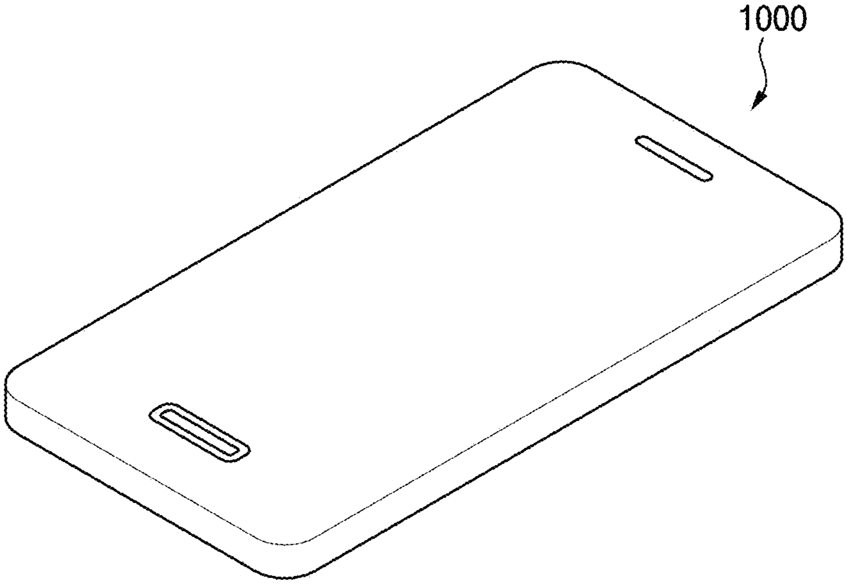
FIG. 12 is a diagram illustrating an example in which the electronic apparatus of FIG. 11 is implemented as a smart phone.

FIG. 11 is a block diagram illustrating an electronic apparatus according to an embodiment of the present inventive concept. FIG. 12 is a diagram illustrating an example in which the electronic apparatus of FIG. 11 is implemented as a smart phone.

Referring to FIGS. 1 to 12, the electronic apparatus 1000 may include a processor 1010, a memory device 1020, a storage device 1030, an input/output (I/O) device 1040, a power supply 1050, and a display apparatus 1060. Here, the display apparatus 1060 may be the display apparatus of FIG. 1. In addition, the electronic apparatus 1000 may further include a plurality of ports for communicating with a video card, a sound card, a memory card, a universal serial bus (USB) device, other electronic apparatuses, etc.

In an embodiment, as illustrated in FIG. 12, the electronic apparatus 1000 may be implemented as a smart phone. However, the electronic apparatus 1000 is not limited thereto. For example, the electronic apparatus 1000 may be implemented as a cellular phone, a video phone, a smart pad, a smart watch, a tablet PC, a car navigation system, a computer monitor, a laptop, a head mounted display (HMD) device, and the like.

The processor 1010 may perform various computing functions or various tasks. The processor 1010 may be a micro-processor, a central processing unit (CPU), an application processor (AP), and the like. The processor 1010 may be coupled to other components via an address bus, a control bus, a data bus, etc. Further, the processor 1010 may be coupled to an extended bus such as a peripheral component interconnection (PCI) bus.

The processor 1010 may output the input image data IMG and the input control signal CONT to the driving controller 200 of FIG. 1.

The memory device 1020 may store data for operations of the electronic apparatus 1000. For example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like.

The storage device 1030 may include a solid state drive (SSD) device, a hard disk drive (HDD) device, a CD-ROM device, and the like. The I/O device 1040 may include an input device such as a keyboard, a keypad, a mouse device, a touch-pad, a touch-screen, and the like and an output device such as a printer, a speaker, and the like. In some embodiments, the display apparatus 1060 may be included in the I/O device 1040. The power supply 1050 may provide power for operations of the electronic apparatus 1000. The display apparatus 1060 may be coupled to other components via the buses or other communication links.

Figure 13:
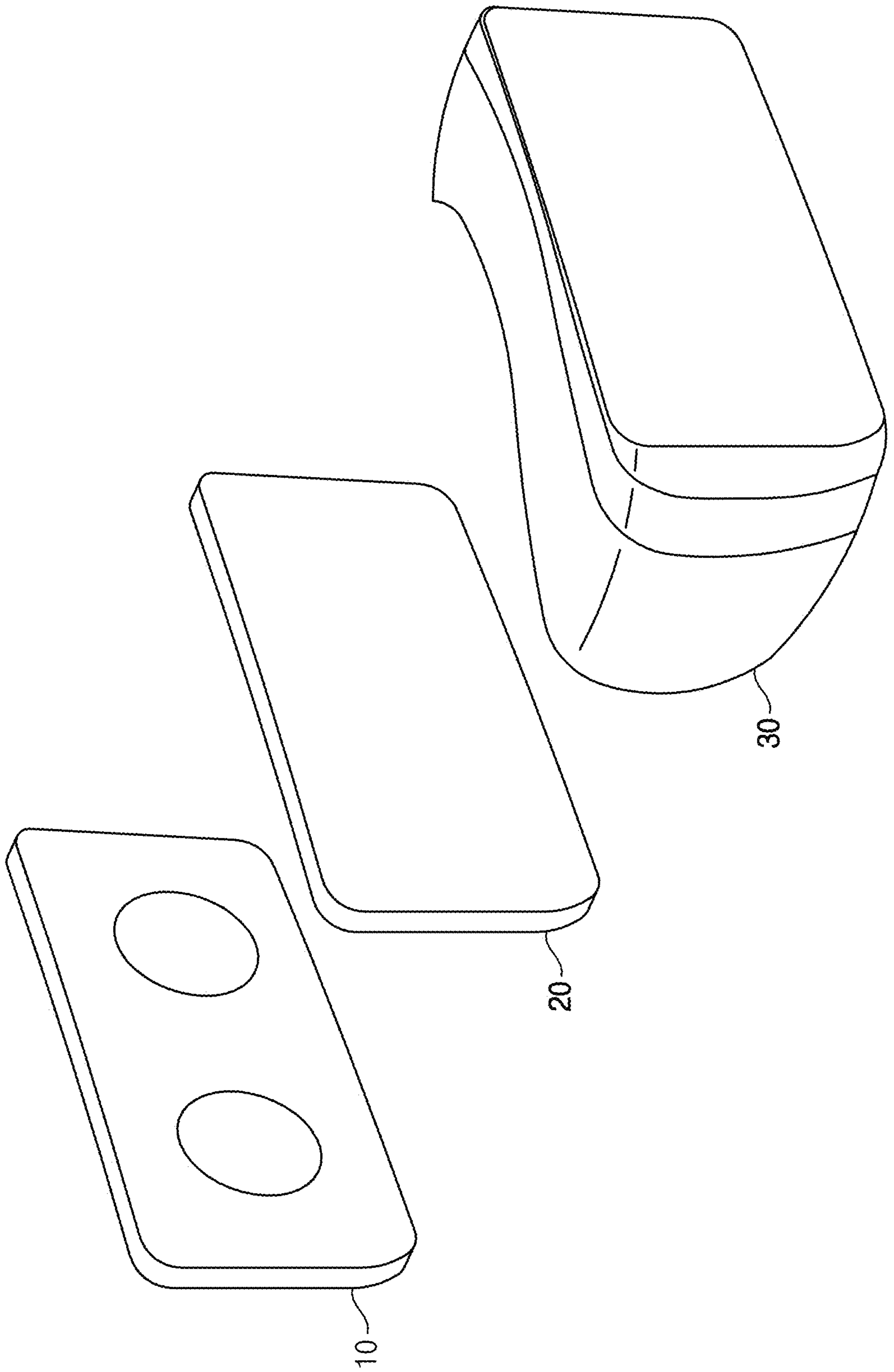
FIG. 13 is a diagram illustrating an example in which the electronic apparatus of FIG. 11 is implemented as a virtual reality display system.

FIG. 13 is a diagram illustrating an example in which the electronic apparatus of FIG. 11 is implemented as a virtual reality display system.

Referring to FIGS. 11 and 13, the virtual reality (VR) display system may include a lens 10, a display apparatus 20 and a housing 30. The display apparatus 20 may be disposed adjacent to the lens 10. The housing 30 may receive the lens 10 and the display apparatus 20. Although the lens 10 and the display apparatus 20 are received on a first side of the housing 30 in FIG. 13, the present inventive concept may not be limited thereto. For example, the lens 10 may be received on a first side of the housing 30 and the display apparatus 20 may be received on a second side of the housing 30 opposite to the first side of the housing 30. When the lens 10 and the display apparatus 20 are received on opposite sides with respect to the housing 30, the housing 30 may have a transmitting portion to transmit a light.

For example, the VR display system may be a head mounted display system worn on a user's head. Although not shown in figures, the VR display system may further include a head band to fix the VR display system to the user's head.

Alternatively, the VR display system may have a form of smart glasses designed as a shape of glasses.

In addition, the electronic apparatus may be implemented as an augmented reality (AR) display system for supporting an augmented reality. The AR display system may have a smartphone shape, a smart glasses shape, a head mounted display shape, etc., but may not be limited to those shapes.

In addition, the electronic apparatus may be implemented as a mixed reality (MR) display system for supporting a mixed reality. The MR display system may have a smartphone shape, a smart glasses shape, a head mounted display shape, etc., but may not be limited to those shapes.

According to the display apparatus of the present inventive concept as explained above, the power consumption of the display apparatus may be reduced and the display quality of the display panel may be enhanced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

What is claimed is:

1. A pixel comprising:

a driving switching element including a control electrode connected to a first node, a first electrode connected to a second node and a second electrode connected to a third node;

a writing switching element including a control electrode configured to receive a writing gate signal, a first electrode configured to receive a data voltage and a second electrode connected to the second node;

a compensation switching element including a control electrode configured to receive a compensation gate signal, a first electrode connected to the first node and a second electrode connected to the third node;

a storage capacitor including a first electrode configured to receive a first power voltage and a second electrode connected to the first node;

a first emission switching element including a first electrode connected to the third node and a second electrode connected to a first electrode of the light emitting element; and a second emission switching element including a first electrode configured to receive the first power voltage and a second electrode connected to the second node;

an initialization switching element including a control electrode configured to receive an initialization gate signal, a first electrode configured to receive an initialization voltage and a second electrode connected to the first electrode of the light emitting element, wherein, in a first period, an n-th stage emission signal applied to a control electrode of the second emission switching element has an inactive level, an (n+1)-th stage emission signal applied to a control electrode of the first emission switching element has an active level, the writing gate signal has an active pulse, the compensation gate signal has an inactive level and the initialization gate signal has an inactive level; and a light emitting element configured to emit light based on a driving current flowing through the driving switching element, wherein the writing gate signal is an n-th stage writing gate signal, wherein the compensation gate signal is an (n+k)-th stage writing gate signal, and wherein n is a positive integer and k is a positive integer.

2. The pixel of claim 1, wherein the writing gate signal is the n-th stage writing gate signal, and wherein the compensation gate signal is an (n+1)-th stage writing gate signal.

3. The pixel of claim 1, wherein, in a second period subsequent to the first period, the n-th stage emission signal has the inactive level, the (n+1)-th stage emission signal has an inactive level, the writing gate signal has an inactive level, the compensation gate signal has an active pulse and the initialization gate signal has the inactive level, wherein, in a third period subsequent to the second period, the n-th stage emission signal has the inactive level and an active level subsequent to the inactive level, the (n+1)-th stage emission signal has the inactive level, the writing gate signal has the inactive level, the compensation gate signal has the inactive level and the initialization gate signal has an active pulse, and wherein, in a fourth period subsequent to the third period, the n-th stage emission signal has the active level, the (n+1)-th stage emission signal has the active level, the writing gate signal has the inactive level, the compensation gate signal has the inactive level and the initialization gate signal has the inactive level.

4. The pixel of claim 1, wherein, in a second period subsequent to the first period, the n-th stage emission signal has the inactive level, the (n+1)-th stage emission signal has an inactive level, the writing gate signal has a second active pulse, the compensation gate signal has a first active pulse and the initialization gate signal has the inactive level, wherein, in a third period subsequent to the second period, the n-th stage emission signal has the inactive level and an active level subsequent to the inactive level, the (n+1)-th stage emission signal has the inactive level, the writing gate signal has the inactive level, the compensation gate signal has a second active pulse and the initialization gate signal has an active pulse, and wherein, in a fourth period subsequent to the third period, the n-th stage emission signal has the active level, the (n+1)-th stage emission signal has the active level, the writing gate signal has the inactive level, the compensation gate signal has the inactive level and the initialization gate signal has the inactive level.

5. A display apparatus comprising:

a display panel including a pixel; and a display panel driver configured to output a data voltage to the pixel, wherein the display panel driver comprises:

a power regulator including a power terminal configured to receive a data power voltage, a first input terminal configured to receive a reference voltage and a second input terminal and an output terminal which are connected to each other; and an amplifier including a power terminal connected to the output terminal of the power regulator, a first input terminal configured to receive a first data, a second input terminal configured to receive a second data and an output terminal, wherein the pixel comprises:

a driving switching element including a control electrode connected to a first node, a first electrode connected to a second node and a second electrode connected to a third node;

a writing switching element including a control electrode configured to receive a writing gate signal, a first electrode configured to receive the data voltage and a second electrode connected to the second node;

a compensation switching element including a control electrode configured to receive a compensation gate signal, a first electrode connected to the first node and a second electrode connected to the third node;

a storage capacitor including a first electrode configured to receive a first power voltage and a second electrode connected to the first node; and a light emitting element configured to emit light based on a driving current flowing through the driving switching element, wherein the writing gate signal is an n-th stage writing gate signal, wherein the compensation gate signal is an (n+k)-th stage writing gate signal, and wherein n is a positive integer and k is a positive integer.

6. The display apparatus of claim 5, wherein the display panel driver further comprises a reference voltage generator configured to output the reference voltage to the first input terminal of the power regulator, and wherein the reference voltage generator comprises:

a bipolar junction transistor configured to output a first voltage;

a second voltage generator configured to generate a second voltage;

a multiplier configured to generate a multiplied voltage by a multiplication of the second voltage; and an adder configured to add the multiplied voltage to the first voltage to generate the reference voltage.

7. The display apparatus of claim 5, wherein the amplifier comprises:

a first circuit configured to receive the first data and the second data; and a second circuit connected to the first circuit to output operation data.

8. The display apparatus of claim 7, wherein the first circuit comprises:

a first transistor including a control electrode connected to a first operation node, a first electrode configured to receive a second data power voltage and a second electrode connected to the first operation node;

a second transistor including a control electrode connected to the first operation node, a first electrode configured to receive the second data power voltage and a second electrode connected to a second operation node;

a third transistor including a control electrode configured to receive the first data, a first electrode connected to the first operation node and a second electrode connected to a third operation node;

a fourth transistor including a control electrode configured to receive the second data, a first electrode connected to the second operation node and a second electrode connected to the third operation node; and a fifth transistor including a control electrode configured to receive an enable signal, a first electrode connected to the third operation node and a second electrode connected to a ground.

9. The display apparatus of claim 8, wherein the second circuit comprises:

a sixth transistor including a control electrode connected to the second operation node, a first electrode configured to receive the second data power voltage and a second electrode connected to the output terminal of the amplifier; and a seventh transistor including a control electrode configured to receive a disable signal, a first electrode connected to the output terminal of the amplifier and a second electrode connected to the ground.

10. The display apparatus of claim 9, wherein a level of the second data power voltage is substantially the same as a level of the data power voltage, and wherein a ripple of the second data power voltage is less than a ripple of the data power voltage.

11. The display apparatus of claim 5, wherein the display panel driver further comprises a filter including:

a diode connected to the output terminal of the amplifier; and a first capacitor connected to the diode.

12. The display apparatus of claim 11, wherein the power regulator, the amplifier and the filter are integrated on a peripheral region of the display panel.

13. The display apparatus of claim 11, wherein the power regulator, the amplifier and the filter are formed as an integrated element, and wherein the integrated element is connected to the display panel.

14. An electronic device comprising:

a display panel including a pixel; and a display panel driver configured to output a data voltage to the pixel, wherein the pixel comprises:

a driving switching element including a control electrode connected to a first node, a first electrode connected to a second node and a second electrode connected to a third node;

a writing switching element including a control electrode configured to receive a writing gate signal, a first electrode configured to receive the data voltage and a second electrode connected to the second node;

a compensation switching element including a control electrode configured to receive a compensation gate signal, a first electrode connected to the first node and a second electrode connected to the third node;

a storage capacitor including a first electrode configured to receive a first power voltage and a second electrode connected to the first node a first emission switching element including a first electrode connected to the third node and a second electrode connected to a first electrode of the light emitting element; and a second emission switching element including a first electrode configured to receive the first power voltage and a second electrode connected to the second node;

an initialization switching element including a control electrode configured to receive an initialization gate signal, a first electrode configured to receive an initialization voltage and a second electrode connected to the first electrode of the light emitting element, wherein, in a first period, an n-th stage emission signal applied to a control electrode of the second emission switching element has an inactive level, an (n+1)-th stage emission signal applied to a control electrode of the first emission switching element has an active level, the writing gate signal has an active pulse, the compensation gate signal has an inactive level and the initialization gate signal has an inactive level; and a light emitting element configured to emit light based on a driving current flowing through the driving switching element, wherein the writing gate signal is an n-th stage writing gate signal, wherein the compensation gate signal is an (n+k)-th stage writing gate signal, and wherein n is a positive integer and k is a positive integer.

* * * * *